US011364469B2

(12) United States Patent
Kasai et al.

(10) Patent No.: US 11,364,469 B2
(45) Date of Patent: Jun. 21, 2022

(54) HOLLOW FIBER MEMBRANE MODULE AND FILTERING METHOD (71) Applicant: ASAHI KASEI KABUSHIKI KAISHA, Tokyo (JP)

(72) Inventors: Shigenori Kasai, Tokyo (JP); Daisuke Okamura, Tokyo (JP)

(73) Assignee: ASAHI KASEI KABUSHIKI KAISHA, Tokyo (JP)

(*) Notice: Subject to any disclaimer, the term of this patent is extended or adjusted under 35 U.S.C. 154(b) by 37 days.

(21) Appl. No.: 16/613,808

(22) PCT Filed: Jun. 20, 2018

(86) PCT No.: PCT/JP2018/023481
§ 371 (c)(1),
(2) Date: Nov. 15, 2019

(87) PCT Pub. No.: WO2018/235871
PCT Pub. Date: Dec. 27, 2018

(65) Prior Publication Data
US 2020/0171438 A1    Jun. 4, 2020

(30) Foreign Application Priority Data
Jun. 20, 2017  (JP) .............................. JP2017-120509

(51) Int. Cl.
*B01D 63/04* (2006.01)
*B01D 63/02* (2006.01)
(Continued)

(52) U.S. Cl.
CPC ......... *B01D 63/043* (2013.01); *B01D 63/022* (2013.01); *C02F 1/44* (2013.01);
(Continued)

(58) Field of Classification Search
CPC .... B01D 63/043; B01D 63/022; B01D 63/02; C02F 1/44; C02F 1/444; C02F 2103/007;
(Continued)

(56) References Cited

U.S. PATENT DOCUMENTS 6,331,248 B1    12/2001  Taniguchi et al.
2008/0269468 A1  10/2008  Vogel et al.
(Continued)

FOREIGN PATENT DOCUMENTS

CN    101234294 A    8/2008
CN    201470318 U    5/2010
(Continued)

OTHER PUBLICATIONS

Dec. 24, 2019, International Preliminary Reporton Patentability issued in the International Patent Application No. PCT/JP2018/023481.
(Continued)

*Primary Examiner* — Liam Royce
(74) *Attorney, Agent, or Firm* — Kenja IP Law PC (57) ABSTRACT

Provided is a hollow fiber membrane module comprising: a hollow fiber membrane bundle; a housing; a first adhesively-fixed portion and a second adhesively-fixed portion configured to adhesively fix, at both ends of each of the hollow fiber membranes, with a potting material: the hollow fiber membranes to each other, and the hollow fiber membrane bundle to an inner wall of the housing; and a regulating member 40 configured to regulate arrangement of the hollow fiber membranes, wherein: on an end face outer than the housing of at least one of the first adhesively-fixed portion or the second adhesively-fixed portion, when a range of a circle having a center at a center of the end face and a radius equal to ½ of a radius of the end face is defined as a central portion, and a range other than the central portion is defined
(Continued)

as a circumferential portion, a ratio of an area ratio of the regulating member 40 and the potting material to an entire area of the central portion to an area ratio of the regulating member 40 and the potting material to an entire area of the circumferential portion is 0.8 or more and 1.2 or less.

11 Claims, 5 Drawing Sheets

(51) Int. Cl.
    *C02F 1/44*     (2006.01)
    *C02F 103/00*     (2006.01)
    *C02F 103/06*     (2006.01)
    *C02F 103/08*     (2006.01)

(52) U.S. Cl.
    CPC .... *C02F 2103/007* (2013.01); *C02F 2103/06* (2013.01); *C02F 2103/08* (2013.01); *C02F 2303/04* (2013.01)

(58) Field of Classification Search
    CPC .............. C02F 2103/06; C02F 2103/08; C02F 2303/04; C02F 2201/004
    See application file for complete search history.

(56) References Cited

U.S. PATENT DOCUMENTS

2011/0114551 A1   5/2011   Suzuki et al.
2015/0197431 A1   7/2015   Shiki

FOREIGN PATENT DOCUMENTS

| | | |
|---|---|---|
| CN | 102026711 A | 4/2011 |
| CN | 104772041 A | 7/2015 |
| JP | S60232207 A | 11/1985 |
| JP | 2000185220 A | 7/2000 |
| JP | 2003080038 A | 3/2003 |
| JP | 2006051455 A | 2/2006 |
| JP | 2008514237 A | 5/2008 |
| JP | 2012045453 A | 3/2012 |
| JP | 2014147860 A | 8/2014 |
| JP | 2015131267 A | 7/2015 |
| WO | 9710893 A1 | 3/1997 |

OTHER PUBLICATIONS

Sep. 4, 2018, International Search Report issued in the International Patent Application No. PCT/JP2018/023481.

HOLLOW FIBER MEMBRANE MODULE AND FILTERING METHOD

TECHNICAL FIELD

This disclosure relates to: a hollow fiber membrane module used in a filtering device for clarifying a large quantity of raw water such as river water, lake water, underground water, sea water, domestic wastewater and industrial wastewater and eliminating bacteria included therein; and a filtering method using the hollow fiber membrane module.

BACKGROUND

In general, a hollow fiber membrane module is classified broadly into an internal pressure type and an external pressure type. The external pressure type of hollow fiber membrane module normally has a structure of bundling several hundreds to tens of thousands of hollow fiber membranes with a length of 200 to 3,000 mm and an outside diameter of 0.1 to 5 mm, accommodating the bundle in a tubular housing, and configured to adhesively fix the ends on both sides to an inner wall of the housing with a potting material (adhesive). When adhesively fixing both ends, there are a one-end collection type module and a both-ends collection type module: the former is formed so as to have the end of the hollow fiber membrane opened in one adhesively-fixed portion, have the hollow portion of fiber membrane sealed at the other adhesively-fixed portion, supply compressively raw water to a region sandwiched between the adhesively-fixed portions to permeate through the hollow fiber membrane, and take the filtrate out from the adhesively-fixed portion in which the end of the hollow fiber is opened; and the latter is formed so as to have the ends of the hollow fiber membrane opened in both adhesively-fixed portions, and take the filtrate out from both ends. Furthermore, there are a plurality of through holes at the adhesively-fixed portion which become a lower side when being used, and their ports are used as a port for supplying water to be treated during filtration treatment, and as an air supply port and a cleaning waste water outlet in a physical cleaning process.

When such an external pressure type hollow fiber membrane module is used for the purpose of bacteria eliminating and clarification, it is normally subjected to a cross flow filtration to prevent a suspended solid from depositing on the surface of a hollow fiber membrane, or to periodic physical cleaning such as back wash and air scrubbing to recover filter performance, thereby enabling a stable filtration operation.

When the module is used for external-pressure filtration, the water to be treated containing the suspended solid is supplied from through holes provided in the adhesively-fixed portion on the lower side, and concentrated water is discharged from a nozzle provided in the side face in the upper portion of the housing. In addition, in a cleaning step by air scrubbing, the module is cleaned by the steps of: supplying air from the through holes on the lower side, and simultaneously supplying clean water to the hollow portion of each hollow fiber membrane in the adhesively-fixed portion on the upper side; thereby forming an air/water mixture flow; oscillating the hollow fiber membranes by the air/water flow; thereby stripping off the suspended solid deposited on the surface of each membrane; then discharging it from the nozzle provided at the side face in the upper portion of the housing.

In such cleaning step by air scrubbing, there is a problem that due to oscillation of the hollow fiber membrane, stress is concentrated to the hollow fiber membranes in the vicinity of the inner surface of the adhesively-fixed portion, which is likely to cause breakage of the hollow fiber membrane.

In particular, in the aforementioned case where a hollow fiber membrane bundle is housed in a housing and fixed at opposite ends of the bundle using adhesively-fixed portions, the density distribution of the hollow fiber membranes is likely to be biased. When the hollow fiber membranes are formed with a large bias retained, the aforementioned hollow fiber membranes oscillate greatly and are likely to break.

To solve this problem, for example, a hollow fiber membrane module is disclosed in which a regulating member configured to prevent a bias of the density distribution of the hollow fiber membranes is disposed in an adhesively-fixed portion of an end of the hollow fiber membrane bundle (see JP2015-131267A, JP2012-045453A and JP2000-185220A (PTL1 to PTL3)).

CITATION LIST

Patent Literature

PTL1: JP2015-131267A
PTL2: JP2012-045453A
PTL3: JP2000-185220A

SUMMARY

Technical Problem

However, for example, in a case where a cross-shaped regulating member is disposed at a center of the hollow fiber membrane bundle according to the hollow fiber membrane modules as disclosed in PTL1 to PTL3, it is possible to roughly adjusting density distribution of the hollow fiber membranes by partitioning sections of distribution of the hollow fiber membranes with the regulating member. However, with parts having comparatively low density of hollow fiber membrane formed, it is actually difficult to equalize the overall density of hollow fiber membrane.

Figure 6:
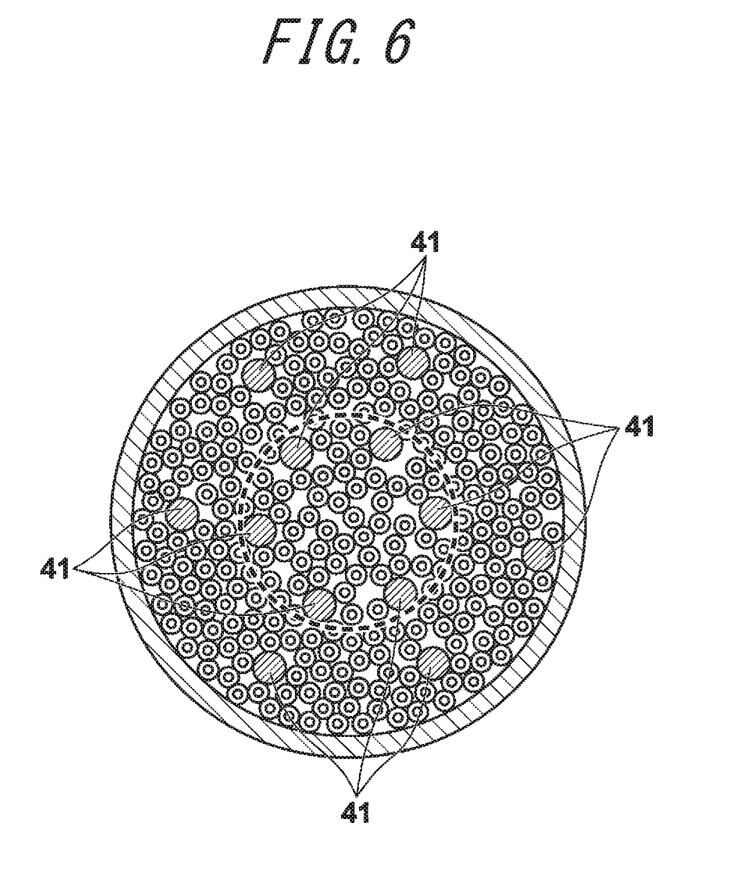
FIG. 6 illustrates the end face of the second adhesively-fixed portion of the hollow fiber membrane module according to Comparative Example 1.

The shape of the regulating member is not limited to cross shape, and there is a method inserting a plurality of cylindrical regulating members in the hollow fiber membrane bundle. FIG. 6 illustrates an end face of the hollow fiber membrane bundle with twelve cylindrical regulating members 41 inserted and arranged therein. In FIG. 6, the plurality of small double circles represent each hollow fiber membrane, and the white part except for the hollow fiber membranes and the regulating members 41 represent the potting material. It is understood that in a case where the regulating members 41 are arranged as illustrated in FIG. 6, the density of hollow fiber membranes in a central portion of the hollow fiber membrane bundle (the range of dotted line) is in a nondense state as compared to a circumferential portion outer than the central portion. Further, certifying the inner portion of a section along the longitudinal direction of the hollow fiber membrane bundle, it is understood that the length of raised portions formed by the potting material on the surfaces of each hollow fiber membrane is longer in the central portion than in the circumferential portion. Here, the raised portions refer to portions formed by the potting material raised from the interface of the potting material in the housing along the surface of each hollow fiber membrane. Further, it is understood that when the raised portions are long, since the hollow fiber membranes cannot bend softly in the vicinity of the interface of the potting material, the aforementioned oscillation of the hollow fiber membranes cannot be absorbed, which is more likely to cause breakage.

The following specifically describes the reason why, in a case where the density of the hollow fiber membranes in the central portion of the hollow fiber membrane bundle is in a nondense state as compared to the circumferential portion, the length of the raised portions is longer than the circumferential portion. When manufacturing the hollow fiber membrane module as described above, adhesively-fixed portions are formed through, for example, centrifugal adhesion. Specifically, centrifugal adhesion is performed by injecting the potting material into both ends of the housing, and rotating the housing injected with the potting material in the horizontal direction. Due to such centrifugal adhesion, most of the potting material concentrate on both ends of the housing, and the adhesively-fixed portions are formed thereby. However, a part of the potting material remains along the surface of each hollow fiber membrane, and the raised portions are formed by the remaining potting material.

In a conventional hollow fiber membrane module, as described above, since the density of the hollow fiber membranes is lower in the central portion of the end faces of the hollow fiber membrane bundle, when injecting the potting material, more potting material is injected between the hollow fiber membranes in the central portion as compared to between the hollow fiber membranes in the circumferential portion. Therefore, even after centrifugal adhesion, the potting material adhered to the surfaces between the hollow fiber membranes in the central portion cannot completely return to both ends of the hollow fiber membrane bundle, and as a result, the length of the raised portions in the central portion is elongated.

It would thus be helpful to provide a hollow fiber membrane module and a filtering method capable of inhibiting breakage of hollow fiber membranes.

The hollow fiber membrane module of this disclosure comprises: a hollow fiber membrane bundle formed by bundling a plurality of hollow fiber membranes; a tubular housing in which the hollow fiber membrane bundle is housed; a first adhesively-fixed portion configured to adhesively fix, at one end of each of the hollow fiber membranes, with a resin material, the hollow fiber membranes to each other, and the hollow fiber membrane bundle to an inner wall of the housing; a second adhesively-fixed portion configured to adhesively fix, at the other end of each of the hollow fiber membranes, with a resin material, the hollow fiber membranes to each other, and the hollow fiber membrane bundle to the inner wall of the housing; and a regulating member being disposed on at least one of the first adhesively-fixed portion or the second adhesively-fixed portion, and configured to regulate arrangement of the hollow fiber membranes, wherein: on an end face outer than the housing of at least one of the first adhesively-fixed portion or the second adhesively-fixed portion, when a range of a circle having a center at a center of the end face and a radius equal to ½ of a radius of the end face is defined as a central portion, and a range other than the central portion is defined as a circumferential portion, a ratio of an area ratio of the regulating member and the resin material to an entire area of the central portion to an area ratio of the regulating member and the resin material to an entire area of the circumferential portion is 0.8 or more and 1.2 or less.

In the hollow fiber membrane module of this disclosure, it is preferable that a ratio of an entire area of end faces of thick wall portions of the hollow fiber membranes included in the central portion to the entire area of the central portion is 50% or more.

In the hollow fiber membrane module of this disclosure, it is preferable that each of the hollow fiber membranes has a hollow portion closed at one end and opened at another end.

In the hollow fiber membrane module of this disclosure, it is preferable that on an end face outer than the housing of the first adhesively-fixed portion or the second adhesively-fixed portion on the other end at which the hollow portion of each of the hollow fiber membranes is opened, the ratio of the area ratio of the regulating member and the resin material to the entire area of the central portion to the area ratio of the regulating member and the resin material to the entire area of the circumferential portion is 0.8 or more and 1.2 or less.

In the hollow fiber membrane module of this disclosure, it is preferable that the first adhesively-fixed portion or the second adhesively-fixed portion on the one end at which the hollow portion of each of the hollow fiber membranes is closed has at least one through hole configured to introduce liquid supplied from outside of the housing into a space inside the housing between the first adhesively-fixed portion and the second adhesively-fixed portion.

In the hollow fiber membrane module of this disclosure, it is preferable that in at least one of the first adhesively-fixed portion or the second adhesively-fixed portion on an end at which a hollow portion of each of the hollow fiber membranes is opened, raised portions formed by the resin material raised from an interface of the resin material inside the housing, along a surface of each of the hollow fiber membranes, have a length of 20 mm or less from the interface.

In the hollow fiber membrane module of this disclosure, it is preferable that at least one of the first adhesively-fixed portion or the second adhesively-fixed portion on an end at which a hollow portion of each of the hollow fiber membranes is opened has a minimum thickness part having a minimum thickness D0 and a maximum thickness part having a maximum thickness D1 such that $D1 \leq 120\% \times D0$ is satisfied.

In the hollow fiber membrane module of this disclosure, it is preferable that the regulating member is cylindrical.

In the hollow fiber membrane module of this disclosure, it is preferable that the regulating member is arranged in both the central portion and the circumferential portion.

The filtering method of this disclosure comprises performing filtration by using the hollow fiber membrane module of this disclosure.

Advantageous Effect

According to the hollow fiber membrane module of this disclosure, by arranging the hollow fiber membranes and the regulating member on the end face outer than the housing of at least one of the first adhesively-fixed portion or the second adhesively-fixed portion in the hollow fiber membrane module in a manner such that the ratio of the area ratio of the regulating member and the resin material to the entire area of the central portion to the area ratio of the regulating member and the resin material to the entire area of the circumferential portion is 0.8 or more and 1.2 or less, it is possible to shorten the length of the raised portions formed on the hollow fiber membranes in the central portion, and to thereby inhibit breakage of the hollow fiber membranes.

METHODS OF IMPLEMENTING THE INVENTION

Figure 1:
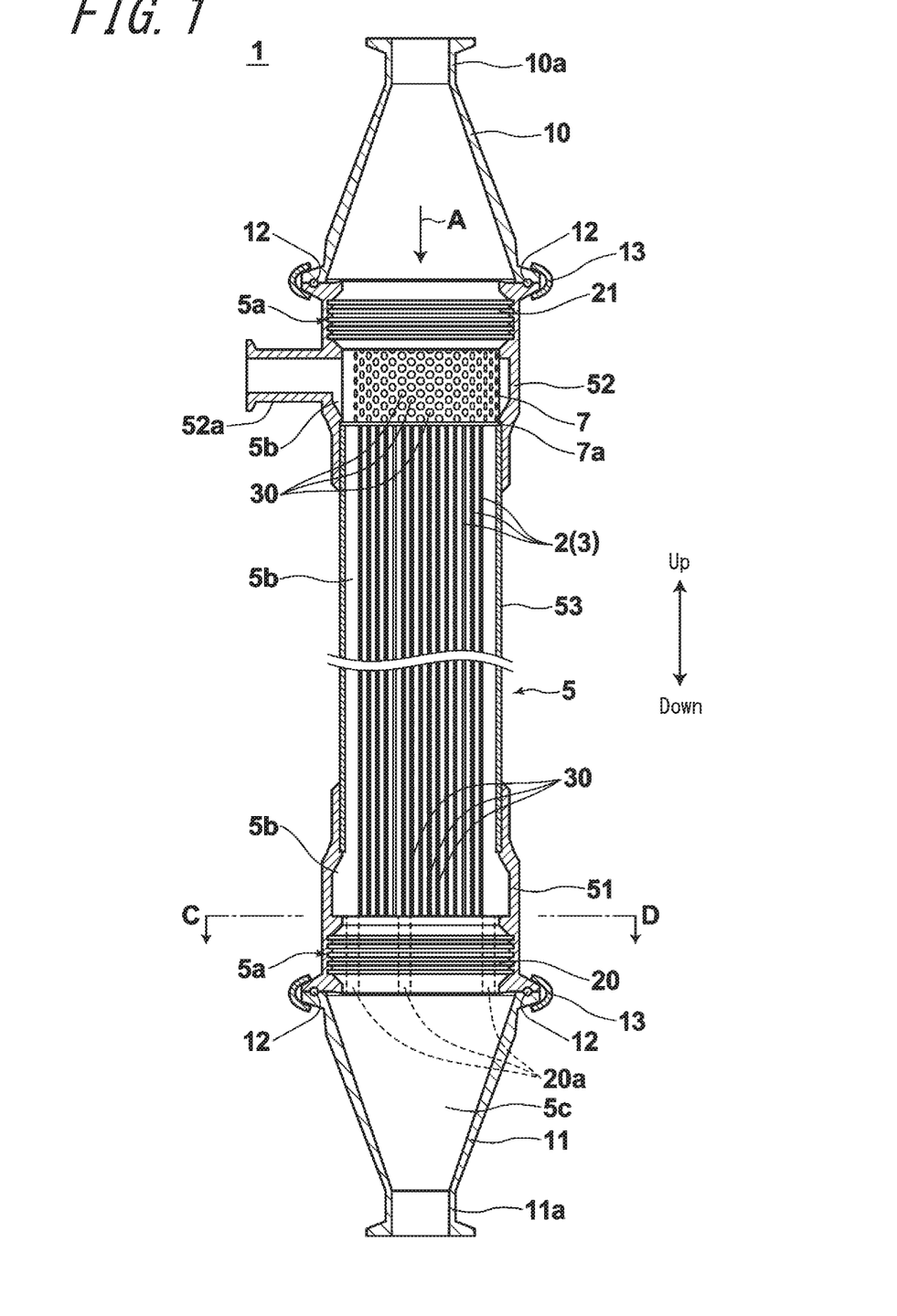
FIG. 1 illustrates a schematic configuration according to one embodiment of the hollow fiber membrane module of this disclosure.

Hereinafter, with reference to the drawings, one embodiment of the hollow fiber membrane module of this disclosure will be described in detail. The hollow fiber membrane module according to the present embodiment is applicable to various fields, such as water and sewage, food industries, general manufacturing, medicine, and physics and chemistry. FIG. 1 illustrates a schematic configuration of the hollow fiber membrane module according to the present embodiment. In FIG. 1, the arrow illustrates the up-down direction. Moreover, hereinafter, the up-down direction illustrated in FIG. 1 represents the up-down direction of the hollow fiber membrane module 1.

As illustrated in FIG. 1, the hollow fiber membrane module 1 according to the present embodiment includes: a hollow fiber membrane bundle 3 formed by bundling a plurality of hollow fiber membranes 2; and a tubular housing 5 in which the hollow fiber membrane bundle 3 is housed. In FIG. 1, the housing 5 and caps 10, 11 described below are illustrated in a cross-sectional view with their front halves removed.

Examples of the hollow fiber membranes 2 include reverse osmosis membranes, nano-filtration membranes, ultrafiltration membranes, and microfiltration membranes. The material of the hollow fiber membrane is not particularly limited. Examples of the material include polysulfones, polyethersulfones, polyacrylonitriles, polyimides, polyetherimides, polyamides, polyetherketones, polyether ether ketones, polyethylenes, polypropylene, poly(4-methylpentene), ethylene-vinyl alcohol copolymers, cellulose, cellulose acetate, polyvinylidene fluoride, ethylene-tetrafluoroethylene copolymers, polytetrafluoroethylene and the like, and composite materials thereof may also be used.

For the shape of the hollow fiber membranes, the inner diameter is preferably 50 µm to 3000 µm and more preferably 500 µm to 2000 µm. Moreover, membranes having an inner diameter/outer diameter ratio of 0.3 to 0.8 are suitably used.

Caps 10, 11 for connecting piping, in which tubular channels 10a, 11a to which piping is to be connected are formed, are respectively provided at openings at both ends of the housing 5. The caps 10, 11 for connecting piping are fixedly attached to the housing 5 by clamps 13. End faces on the housing 5 side of the caps 10, 11 and end faces on the caps 10, 11 sides of the housing 5 have annular grooves formed thereon, and sanitary gaskets 12 are sandwiched by these grooves. Both ends of the housing and the caps 10, 11 are respectively sealed by these sanitary gaskets 12.

The housing 5 is formed by connecting to each other: a first tubular member 51; a second tubular member 52 formed integrally with a nozzle 52a; and a straight tube-shaped third tubular member 53 arranged between the first tubular member 51 and the second tubular member 52. The nozzle 52a is disposed on one side of the upper end of the housing 5 in a manner projecting in a direction orthogonal to the longitudinal direction of the housing 5.

The nozzle 52a is a nozzle for discharging concentrated water during external-pressure filtration.

The hollow fiber membrane module 1 of the present embodiment is erected in a manner such that its longitudinal direction is in the vertical direction and the nozzle 52a is arranged on the upper side in the vertical direction.

As illustrated in FIG. 1, the end on the upper side of the hollow fiber membrane bundle 3 (the nozzle 52a side) is attached with a straightening cylinder 7. The straightening cylinder 7 is formed in a tubular shape, and is disposed between the opening on the housing 5 inner wall side of the nozzle 52a and the hollow fiber membrane bundle 3, so as to surround the circumference of the hollow fiber membrane bundle 3. The straightening cylinder 7 is disposed so as to ensure the spacing between the hollow fiber membrane bundle 3 and the inner wall of the housing 5 in the vicinity of the nozzle 52a. Thereby, when concentrated water is discharged from the nozzle 52a, it is possible to inhibit oscillation of the hollow fiber membranes 2 to the nozzle 52a side, and to inhibit breakage of the hollow fiber membranes 2.

As illustrated in FIG. 1, the straightening cylinder 7 has a plurality of through holes 30 disposed thereon. The through holes 30 of the straightening cylinder 7 are preferably formed in a region other than a region facing the opening on the housing 5 inner surface side of the nozzle 52a, without being formed in the region facing the opening.

The straightening cylinder 7 includes a flange 7a. The straightening cylinder 7 is positioned by sandwiching the flange 7a in a connecting portion of the second tubular member 52 and the third tubular member 53. The upper end of the straightening cylinder 7 is adhesively fixed inside a second adhesively-fixed portion 21 described below.

At both ends of the hollow fiber membrane bundle 3, a first adhesively-fixed portion 20 and a second adhesively-fixed portion 21 are formed so as to adhesively fix, with a potting material (corresponding to the resin material of this disclosure), the hollow fiber membranes 2 to each other, and the hollow fiber membrane bundle 3 to the inner wall of the housing 5. Annular uneven portions 5a are formed on the inner walls of both ends of the housing 5. By allowing the potting material to flow into grooves of these annular uneven portions 5a, annular uneven structures are formed on side surfaces of the first adhesively-fixed portion 20 and the second adhesively-fixed portion 21. In this way, by forming the annular uneven portions 5a on the inner wall of the housing 5, it is possible to enlarge the adhering area between the housing 5 and the first and second adhesively-fixed portions 20, 21, and to thereby obtain higher adhesion force.

As the potting material, a macromolecular material, such as epoxy resin, vinyl ester resin, urethane resin, unsaturated polyester resin, olefinic polymer, silicone resin, and fluorine-containing resin, is desirable. The material of the potting material may be one of these macromolecular materials, or a combination of plural macromolecular materials thereof.

A region 5b (hereinafter referred to as "outer region") for the water to be treated to flow in is formed outer than the hollow fiber membranes 2 between the first adhesively-fixed portion 20 and the second adhesively-fixed portion 21 formed on both ends of the hollow fiber membrane bundle 3.

Figure 2:
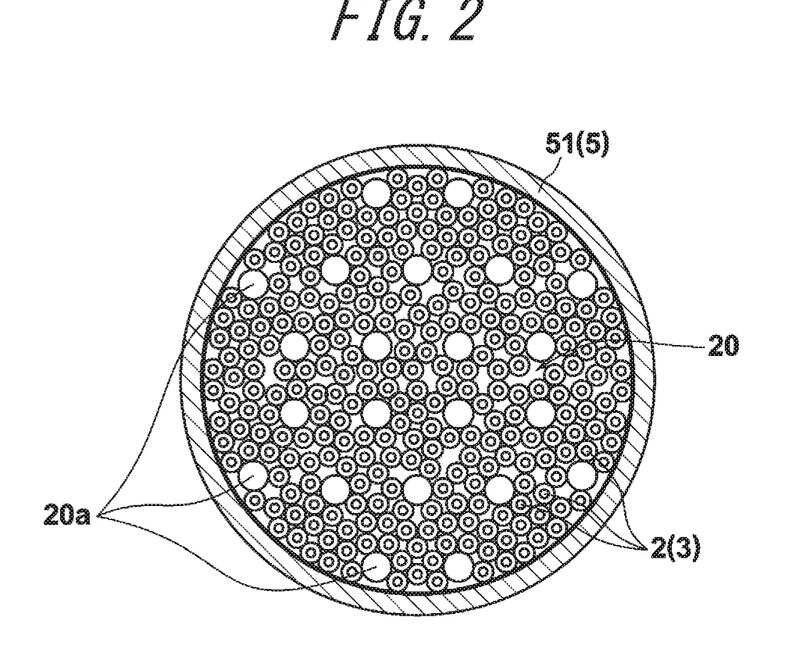
FIG. 2 illustrates a C-D line cross-sectional view of the hollow fiber membrane module as illustrated in FIG. 1.

As illustrated in FIG. 1, a plurality of through holes 20a are formed on the first adhesively-fixed portion 20 located on the lower side when the hollow fiber membrane module 1 is erected in the vertical direction. FIG. 2 is a C-D line cross-sectional view of the hollow fiber membrane module 1 as illustrated in FIG. 1.

The through holes 20a are holes formed in parallel with the longitudinal direction of the housing 5 in a manner connecting to an external region 5c on a side opposite to the aforementioned outer region 5b spanning the first adhesively-fixed portion 20. In the present embodiment, as illustrated in FIG. 2, the plurality of through holes 20a are formed in a manner uniformly distributed inside the first adhesively-fixed portion 20. The through holes 20a are preferably formed in a manner uniformly distributed inside the first adhesively-fixed portion 20 according to the present embodiment, without being limited thereto, and any other arrangement may be used as well.

The hollow portion of each hollow fiber membrane 2 is closed on the side disposed with the through holes 20a, and is opened on the side opposite to the side disposed with the through holes 20a. When performing filtration, the water to be treated (liquid to be treated) flows in from a conduit 11a of the cap 11 disposed outer than the first adhesively-fixed portion 20, and is supplied to the outer region 5b through the through holes 20a.

The water to be treated supplied to the outer region 5b passes through a protecting member 8. Subsequently, filtered water penetrating from the outer surface of each hollow fiber membrane 2 and passing through the hollow portion of each hollow fiber membrane 2 flows out from a conduit 10a of the cap 10, and concentrated water flows out from the nozzle 52a.

Here, after being used in the aforementioned external-pressure filtration, the hollow fiber membrane module 1 according to the present embodiment is periodically washed through air scrubbing. Specifically, clean water is supplied from the second adhesively-fixed portion 21 side on the upper side, and simultaneously air is supplied to the through holes 20a of the first adhesively-fixed portion 20 on the lower side. By discharging the two supplied fluids from the nozzle 52a of the second tubular member 52, the hollow fiber membranes 2 are oscillated so as to wipe down attached dirt. During such air scrubbing, there is a problem that the hollow fiber membranes 2 in the vicinity of the second adhesively-fixed portion 21 are likely to break due to the oscillation.

In particular, in a conventional hollow fiber membrane module, there is a problem that as a result of using a regulating member in the second adhesively-fixed portion on the upper side so as to regulate the positions of the hollow fiber membranes, the density of the hollow fiber membranes in the central portion on the end face of the second adhesively-fixed portion is lowered, and therefore during formation of the second adhesively-fixed portion, the length of the raised portions is elongated and the hollow fiber membranes are likely to break. As described above, the raised portions refer to portions formed by the potting material raised from the interface of the potting material along the surface of each hollow fiber membrane 2.

Then, in the hollow fiber membrane module 1 according to the present embodiment, each hollow fiber membrane 2 is arranged in a manner such that the density of the hollow fiber membranes 2 is equalized spanning the entire end face outer than the housing 5 of the second adhesively-fixed portion 21.

Figure 3:
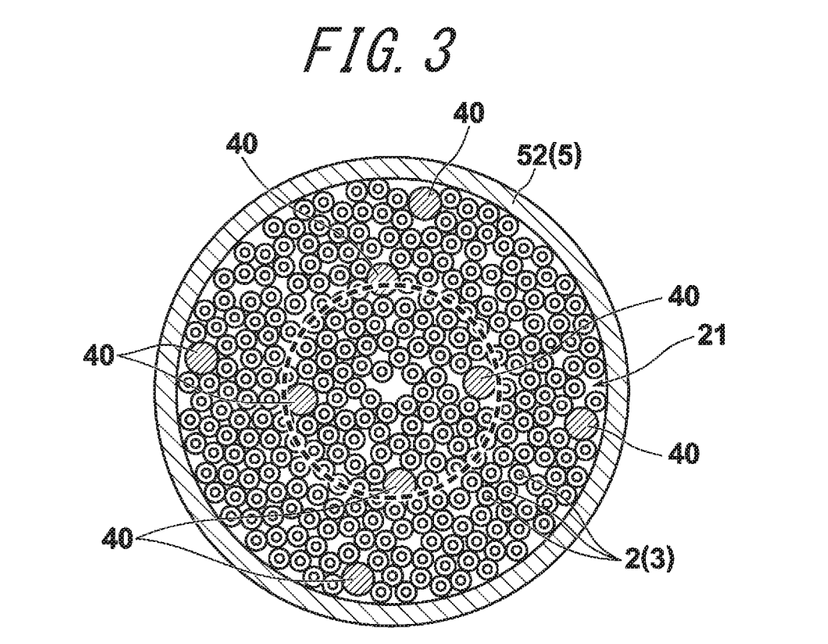
FIG. 3 illustrates a schematic view when the end face of the second adhesively-fixed portion of the hollow fiber membrane module as illustrated in FIG. 1 is viewed from the direction of the arrow A.

FIG. 3 illustrates a schematic view when the end face of the second adhesively-fixed portion 21 of the hollow fiber membrane module 1 as illustrated in FIG. 1 is viewed from the direction of the arrow A.

As illustrated in FIG. 3, the hollow fiber membrane module 1 of the present embodiment has cylindrical regulating members 40 disposed inside the second adhesively-fixed portion 21. The regulating members 40 are cylindrical members formed of resin. On the end face of the second adhesively-fixed portion 21 as illustrated in FIG. 3, the white portion other than the hollow fiber membranes 2 and the regulating members 40 represents the potting material.

In the hollow fiber membrane module 1 of the present embodiment, eight regulating members 40 are arranged in a manner equally distributed spanning the entire end face of the hollow fiber membrane bundle 3.

On the end face outer than the housing 5 of the second adhesively-fixed portion 21, the hollow fiber membranes 2 and the regulating members 40 are arranged in a manner such that when a range of a circle having a center at a center of the end face and a radius equal to ½ of a radius of the end face is defined as a central portion, and a range other than the central portion is defined as a circumferential portion, the ratio of a first area ratio to a second area ratio is 0.8 or more and 1.2 or less, wherein the first area ratio is an area ratio of the regulating member 40 and the resin material to an entire area of the central portion and the second area ratio is an area ratio of the regulating member and the resin material to an entire area of the circumferential portion. The circular range illustrated with dotted line in FIG. 3 is the central portion, and the other range outer than the central portion is the circumferential portion. In the present embodiment, the regulating members 40 are arranged in both the central portion and the circumferential portion.

As illustrated in FIG. 3, by arranging each hollow fiber membrane 2 in a manner such that the density of the hollow fiber membranes 2 is equalized spanning the entire end face of the second adhesively-fixed portion 21, the density of the hollow fiber membranes 2 of the central portion is higher as compared to conventional ones. Thereby, it is possible to shorten the length of the raised portions during formation of the second adhesively-fixed portion 21, and thus the hollow fiber membranes 2 become unlikely to break. The following describes in detail the reason why it is possible to shorten the length of the raised portions.

It is preferable that in the end face of the second adhesively-fixed portion 21, the ratio of the thick wall portions of the hollow fiber membranes included in the central portion to the entire area of the central portion is 50% or more.

Figure 4:
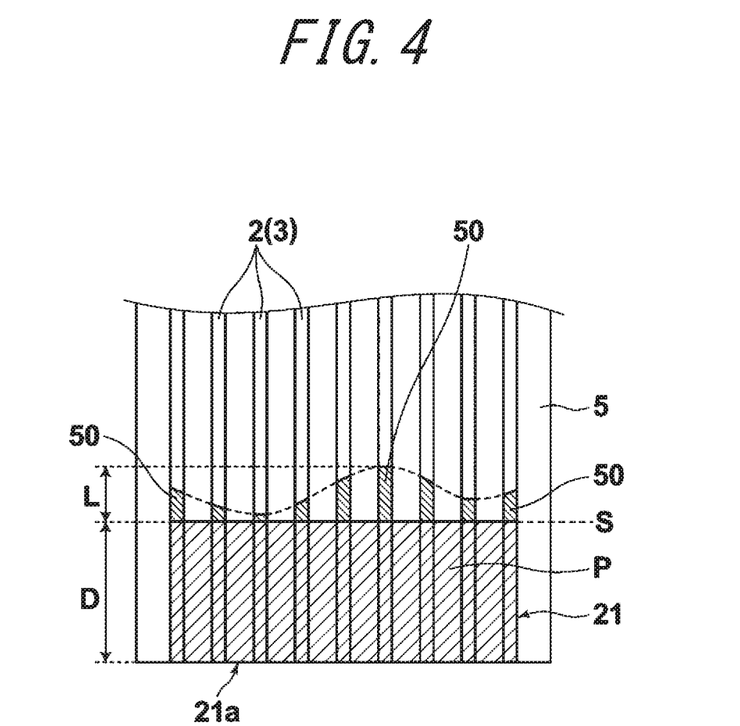
FIG. 4 describes the length of the raised portions and the thickness of the adhesively-fixed portion.

It is preferable that the raised portions have a length from the interface of the potting material of 20 mm or less. Here, the interface of the potting material refers to a surface of the potting material exclusive of the raised portions formed between hollow fiber membranes 2 adjacent to each other. Moreover, the length of the raised portions mentioned here refers to a length of a longest raised portion among a plurality of raised portions formed along each hollow fiber membrane 2. FIG. 4 schematically illustrates the raised portions 50. In FIG. 4, the range P illustrated with slanting line represents the potting material, and the part illustrated with slanting line upper from the interface S of the potting material P represents the raised portion 50. Among the raised portions 50 of each hollow fiber membrane 2, a length L of a longest raised portion 50 is preferably 20 mm or less and more preferably 5 mm or less.

It is preferable that the second adhesively-fixed portion 21 has a minimum thickness part having a minimum thickness D0 and a maximum thickness part having a maximum thickness D1 such that $D1 \leq 120\% \times D0$ is satisfied. Namely, it is preferable that the thickness of the second adhesively-fixed portion 21 has lower unevenness. As illustrated in FIG. 4, the thickness of the second adhesively-fixed portion 21 is a thickness from an end face 21a outer than the housing 5 of the second adhesively-fixed portion 21 to the interface S of the potting material forming the second adhesively-fixed portion 21. FIG. 4 illustrates the case where the aforementioned minimum thickness D0 and maximum thickness D1 are equal to each other.

As described above, in a conventional hollow fiber membrane module, since the density of the hollow fiber membranes is low in the central portion of the end face of the hollow fiber membrane bundle, when injecting the potting material, more potting material is injected between the hollow fiber membranes in the central portion as compared to between the hollow fiber membranes in the circumferential portion. Thereby, the thickness of the central portion of the adhesively-fixed portion is larger than the thickness of the circumferential portion, which increases unevenness of the thickness of the adhesively-fixed portion. In such case where unevenness of thickness of the adhesively-fixed portion is large, there are problems such as partially low pressure resistance and the like. However, as described above, by lowering unevenness of the thickness of the adhesively-fixed portion, such problem can be resolved.

Figure 5:
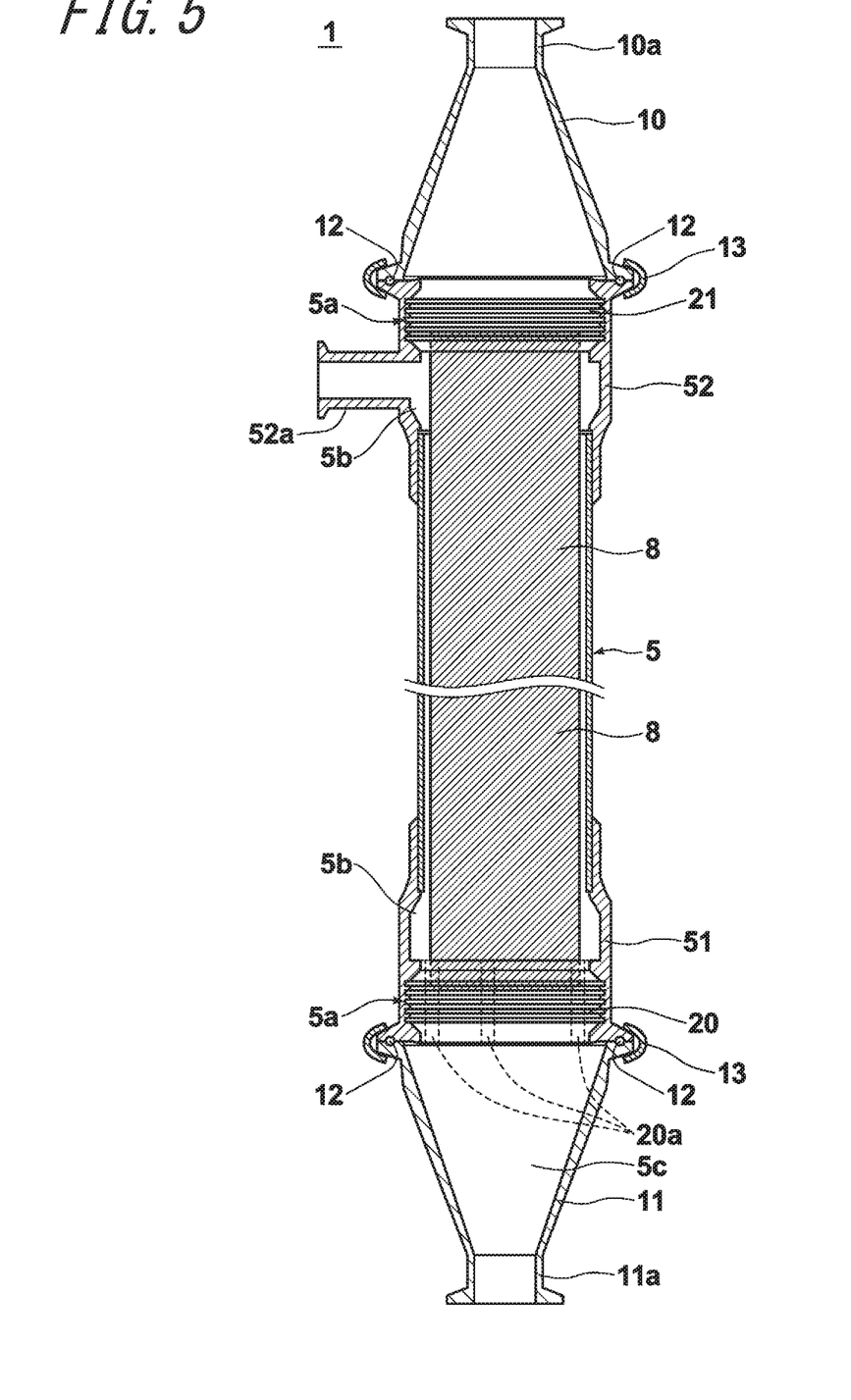
FIG. 5 illustrates the appearance of a protecting member disposed to the housing.

The hollow fiber membrane module 1 further includes a tubular protecting member 8 disposed in a manner wrapping the outer circumferential surface of the hollow fiber membrane bundle 3. FIG. 5 illustrates the appearance of the protecting member 8 disposed inside the housing 5. In FIG. 5, the hollow fiber membrane bundle 3 and the straightening cylinder 7 illustrated in FIG. 1 are omitted. Moreover, in FIG. 1, the protecting member 8 is omitted.

As illustrated in FIG. 5, in the present embodiment, the protecting member 8 is disposed in a manner wrapping approximately the entire outer circumferential surface of the hollow fiber membrane bundle 3. The protecting member 8 used in the present embodiment is formed into a net-like tubular shape as illustrated in FIG. 5, and has flexibility. The material of the net-like protecting member 8 is preferably a material having heat resistance, such as PFA (tetrafluoro-ethylene-perfluoroalkylvinylether copolymer), FEP (tetrafluoroethylene-hexafluoropropylene copolymer), ETFE (tetrafluoroethylene-ethylene copolymer), PTFE (polytetrafluoroethylene), polysulfone, and the like.

Both ends of the protecting member 8 are respectively located inside the first adhesively-fixed portion 20 and inside the second adhesively-fixed portion 21, and are respectively fixed by the first adhesively-fixed portion 20 and the second adhesively-fixed portion 21.

The following describes in detail the method for manufacturing the hollow fiber membrane module 1 of the aforementioned embodiment.

First, the hollow fiber membrane bundle 3 is manufactured by arranging a predetermined number of the hollow fiber membranes 2 as a bundle. Next, the opening of one end of each hollow fiber membrane 2 of the hollow fiber membrane 3 is sealed with a sealing material. Examples of the sealing material include a hot-melt adhesive, and may be another material as well.

Subsequently, the housing 5 is formed by respectively adhering the first tubular member 51 and the second tubular member 52 to both ends of the third tubular member 53, and the straightening cylinder 7 is installed so as to form a module case main body. Further, the circumference of the hollow fiber membrane bundle 3 with the openings on one end sealed is wrapped with the protecting member 8, and the hollow fiber membrane bundle 3 wrapped with the protecting member 8 is inserted into the housing 5. At this time, the hollow fiber membrane bundle 3 is inserted in a manner such that the side of the hollow fiber membrane bundle 3 on which the hollow portions are sealed is located on the second tubular member 52 side.

Afterward, the regulating members 40 are inserted into the end on the second tubular member 52 side of the hollow fiber membrane bundle 3, and arrangement of each hollow fiber membrane 2 is adjusted such that the density of the hollow fiber membranes 2 is equalized on the end as described above. On the other hand, cylindrical members are inserted at positions at which the through holes 20a are to be formed on the end on the first tubular member 51 side of the hollow fiber membrane bundle 3.

Subsequently, containers for forming the adhesively-fixed portions are installed at both ends of the housing 5, and the potting material is injected into both ends of the housing 5. Further, centrifugal adhesion is performed by rotating in the horizontal direction the housing 5 injected with the potting material. Due to such centrifugal adhesion, most of the potting material is concentrated at both ends of the housing 5, thereby forming the first adhesively-fixed portion 20 and the second adhesively-fixed portion 21, but remaining a part of the potting material along the surface of each hollow fiber membrane 2. The remaining potting material forms the raised portions.

In a conventional hollow fiber membrane module, as described above, since the density of the hollow fiber membranes is lower in the central portion of the end faces of the hollow fiber membrane bundle, when injecting the potting material, more potting material is injected between the hollow fiber membranes in the central portion as compared to between the hollow fiber membranes in the circumferential portion. There is a problem such that the potting material attached on the surfaces between the hollow fiber membranes in the central portion does not completely return to both end of the hollow fiber membrane bundle after centrifugal adhesion, and as a result, the length of the raised portions is elongated, and the hollow fiber membranes are likely to break in the vicinity of the raised portions when performing the aforementioned air scrubbing.

In the present embodiment, as described above, since arrangement of each hollow fiber membrane 2 and regulating member 40 is adjusted such that the density of the hollow fiber membranes 2 is equalized on the end face of the hollow fiber membrane bundle 3, the density of each hollow fiber membrane 2 in the central portion of the hollow fiber membrane bundle 3 is raised as compared to conventional ones. Thereby, during formation of the second adhesively-fixed portion 21, it is possible to prevent more potting material from being injected between the hollow fiber membranes in the central portion. Therefore, it is possible to shorten the length of the raised portions, and thus the hollow fiber membranes 2 become unlikely to break.

After formation of the first adhesively-fixed portion 20 and the second adhesively-fixed portion 21, a plurality of through holes 20a are formed by removing the cylindrical members on the first adhesively-fixed portion 20 side. The hollow portions on the first tubular member 51 side of the hollow fiber membrane bundle 3 are closed with the potting material. After curing the potting material, complete cure at a high temperature may be performed as necessary.

After certifying that the potting material in the housing 5 has cured, the containers for forming the adhesively-fixed portions are removed, and the hollow portions of the hollow fiber membrane bundle 3 are opened by cutting the end on the second tubular member 52 side of the second adhesively-fixed portion 21.

Finally, as illustrated in FIG. 1, caps 10, 11 for connecting piping are attached to the two ends of the housing 5, in which the hollow fiber membrane bundle 3 has been adhesively fixed, through the sanitary gaskets 12, respectively. After the caps 10, 11 for connecting piping are fastened and fixed by the clamps 13, a leak test, a trial operation and the like are performed. If production of the hollow fiber membrane module 1 as specified is confirmed, the hollow fiber membrane module 1 is completed.

The present embodiment performs centrifugal adhesion, without being limited thereto. The first adhesively-fixed portion 20 and the second adhesively-fixed portion 21 may be formed through stationary adhesion, by arranging the longitudinal direction of the housing 5 in the vertical direction and injecting the potting material from the lower end of the housing 5.

It is preferable that a tip portion of each regulating members 40 disposed inside the second adhesively-fixed portion 21 is formed into a taper shape with respect to the longitudinal direction Thereby, it is possible to improve inserting performance into the hollow fiber membrane bundle 3. Moreover, it is possible to prevent damage of the surfaces of the hollow fiber membranes 2 when inserting the regulating members 40 into the hollow fiber membrane bundle 3.

The cross-sectional shape of the regulating members 40 is not specifically limited. Examples include circle-shape, ellipse-shape, polygon-shapes such as tetragon-shape, hexagon-shape, fan-shape and the like, and plate-shape. Preferred are circle-shape and ellipse-shape, which do not have the risk of damaging the hollow fiber membranes 2 when inserting the hollow fiber membrane bundle 3.

It is preferable that each cylindrical member disposed inside the first adhesively-fixed portion 20 has a length no less than the thickness of the first adhesively-fixed portion 20, so as to be pulled out after adhesion is completed to form the through holes 20a as described above.

It is preferable that the tip portion of each cylindrical member is formed into a tapered shape as well. By forming the tip portion of each cylindrical member into a tapered shape in this way, it is possible to improve pulling-out performance during formation of the through holes 20a.

The cross-sectional shape of the cylindrical members is not specifically limited. Examples include circle-shape, ellipse-shape, polygon-shapes such as tetragon-shape, hexagon-shape, fan-shape and the like, and plate-shape. Preferred are circle-shape and ellipse-shape, which do not have the risk of damaging the hollow fiber membranes 2 when inserting the hollow fiber membrane bundle 3.

The material of the cylindrical members may be a macromolecular material, an inorganic material, a metal material, and the like, without being limited thereto. It is preferable to form the cylindrical members with a material having weak adhesion force with the potting material, and to use a releasable structure. Specifically, it is preferable that the longitudinal cross-sectional shape of each cylindrical member is circle-shape or ellipse-shape.

The hollow fiber membrane module 1 of the present embodiment is an external pressure type hollow fiber membrane module which has the through holes 20a on the first adhesively-fixed portion 20, and has the regulating members 40 disposed only on the second adhesively-fixed portion 21. However, this disclosure may be applied to another hollow fiber membrane module as well. Specifically, for example, this disclosure may be applied to an external pressure type hollow fiber membrane module in which the water to be treated flows in from a nozzle formed on the side surface of the housing. In this case, the regulating members may be respectively disposed on the adhesively-fixed portions at both ends.

The hollow fiber membranes and the regulating members may be arranged on the end faces of the adhesively-fixed portions at both ends in a manner such that the ratio of the area ratio of the regulating members and the potting material to the entire area of the central portion to the area ratio of the regulating members and the potting material to the entire area of the circumferential portion is 0.8 or more and 1.2 or less.

When used on a discharge side of filtered water of an external pressure type hollow fiber membrane module, incorporated in water treatment equipment, and disposed vertically similarly as the hollow fiber membrane module 1 of the aforementioned embodiment, it is preferable to set the length of the raised portions to 20 mm or less in the second adhesively-fixed portion 21 arranged on the upper side, without being limited thereto. For example, when the hollow portion of each hollow fiber membrane is opened in both the first adhesively-fixed portion and the second adhesively-fixed portion, it is preferable to set the length of the raised portions to 20 mm or less in both the first adhesively-fixed portion and the second adhesively-fixed portion. Namely, it is preferable to set the length of the raised portions to 20 mm or less in an adhesively-fixed portion on an end at which the hollow portion of each hollow fiber membrane is opened.

Regarding the thickness of the first adhesively-fixed portion 20 and the second adhesively-fixed portion 21, similarly as the hollow fiber membrane module 1 of the aforementioned embodiment, it is preferable that the minimum thickness $D0$ and the maximum thickness $D1$ of the second adhesively-fixed portion 21 on the end at which the hollow portion of each hollow fiber membrane 2 is opened satisfy $D1 \leq 120\% \times D0$, without being limited thereto. For example, when the hollow portion of each hollow fiber membrane is opened in both the first adhesively-fixed portion and the second adhesively-fixed portion, it is preferable that the minimum thickness $D0$ and the maximum thickness $D1$ satisfy $D1 \leq 120\% \times D0$ in both the first adhesively-fixed portion and the second adhesively-fixed portion. Namely, it is preferable that the minimum thickness $D0$ and the maximum thickness $D1$ satisfy $D1 \leq 120\% \times D0$ in an adhesively-fixed portion on an end at which the hollow portion of each hollow fiber membranes is opened.

This disclosure may be applied to at least one adhesively-fixed portion of an internal pressure type hollow fiber membrane module.

EXAMPLES

The following describes Examples and Comparative Examples of the hollow fiber membrane module of this disclosure.

Example 1

11,000 hollow fiber membranes (manufactured by Asahi Kasei Corporation) made of PVDF (polyvinylidene fluoride), each having a hollow portion at one end closed, were bundled, and were inserted into a housing having a second tubular member with a straightening cylinder having an inner diameter of 154 mm attached on its inner side. The used hollow fiber membranes had an average bore diameter of 0.1 µm, inner diameter of 0.6 mm, and outer diameter of 1.0 mm.

Subsequently, as illustrated in FIG. 3, eight cylindrical regulating members 40 having an outer diameter of 11 mm (molded by previously spreading in a mold and curing the same adhesive as the potting material described below) were inserted in an equally distributed manner into the end of the hollow fiber membrane bundle on the side that the hollow portions were closed (the second tubular member side). On the other hand, on the end on the first tubular member side of the hollow fiber membrane bundle, cylindrical members were inserted at positions that the through holes were to be formed.

Subsequently, containers for forming the adhesively-fixed portions with a tube for introducing the potting material installed were fixed to both ends of the housing 5 and rotated horizontally, and simultaneously, the potting material was injected into the first tubular member and into the second tubular member of the housing. Used as the potting material was a two-component thermosetting urethane resin (SA-6330A2/SA-6330B5 (trade name), manufactured by Sanyu Rec, Ltd.). At a time point that fluidization stopped due to progress of curing reaction of the potting material, rotation of the centrifuge was stopped, and the product was taken out and cured by heating in an oven at 50° C.

Subsequently, the end on the second tubular member side of the housing was cut, so as to open the hollow portions on the side that the hollow portions were closed in a phase before adhesion. On the other hand, the cylindrical members were removed from the first adhesively-fixed portion on the first tubular member side, so as to form a plurality of through holes.

At this time, when a circle connecting the hollow fiber membranes existing on an outermost circumferential portion of a cutting end face of the second adhesively-fixed portion is defined as a cutting end face circle, a range of a circle having a center at the center of the cutting end face circle and a radius equal to ½ of the radius of the cutting end face circle is defined as a central portion, and a range other than the central portion is defined as a circumferential portion, the area ratios of the potting material and the regulating members in the central portion and the circumferential portion were respectively 47.4% and 46.5%. Namely, the ratio of the area ratio of the potting material and the regulating members in the central portion to the area ratio of the potting material and the regulating members in the circumferential portion was 1.0.

The area ratio of the potting material and the regulating members was obtained according to the following method. First, the cutting end face was filmed in close-up photography mode at a place with an illuminance of 500 lux or more, with a digital camera set at a pixel number of 2,000,000 or more. The image data obtained subsequently was opened with the image analysis software WinROOF 6.1.3, and converted to a monochrome image through the command "Monochrome Image". Subsequently, the color tone was inverted through the command "Invert", and only the cutting end face circle was selected and emphasized at a contrast "100" through the command "Brightness/Contrast". Further, the image was binarized at a threshold "140" through the command "Binarization Using Single Threshold" of "Binarization", and the value of area ratio was obtained by executing the command "Entire Area and Number" of "Measurement", selecting area ratio.

Subsequently, the hollow fiber membrane module was installed to a filtering device with the side that the hollow portions are opened as the upper side, and was subjected to the following physical washing durability test. The effective membrane length of the present hollow fiber membrane module was 2 m.

Clean water was supplied from the second adhesively-fixed portion side on the upper side at a flow rate of 8 m$^3$/hr, and simultaneously, air was supplied to the through holes of the first adhesively-fixed portion on the lower side at a flow rate of 7 m$^3$/hr. The two supplied fluids were discharged from the nozzle of the second tubular member on the upper side. The aforementioned operation was performed continuously except for a monthly leak test. The water temperature during operation was maintained at 5° C.

After 6 months of operation, leak due to breakage of hollow fiber membrane occurred to 5 hollow fiber membranes.

After the test, the membrane module was dismantled to certify the state of the second adhesively-fixed portion on the filtering side. The thickness of the second adhesively-fixed portion on the filtering side was in a range of 33 mm to 37 mm, and the maximum length of the raised portions was 10 mm.

Comparative Example 1

11,000 hollow fiber membranes (manufactured by Asahi Kasei Corporation) made of PVDF (polyvinylidene fluoride), each having a hollow portion at one end closed, were bundled, and were inserted into a housing having a second tubular member with a straightening cylinder having an inner diameter of 154 mm attached on its inner side. The used hollow fiber membranes had an average bore diameter of 0.1 µm, inner diameter of 0.6 mm, and outer diameter of 1.0 mm.

Subsequently, as illustrated in FIG. 6, twelve cylindrical regulating members 41 having an outer diameter of 11 mm (molded by previously spreading in a mold and curing the same adhesive as the potting material described below) were inserted into the end of the hollow fiber membrane bundle on the side that the hollow portions were closed. FIG. 6 illustrates the end face of the second adhesively-fixed portion of the finally manufactured hollow fiber membrane module. On the other hand, on the end on the first tubular member side of the hollow fiber membrane bundle, cylindrical members were inserted at positions that the through holes were to be formed.

Subsequently, containers for forming the adhesively-fixed portions with a tube for introducing the potting material installed were fixed to both ends of the housing 5 and rotated horizontally, and simultaneously, the potting material was injected into the first tubular member and into the second tubular member of the housing. Used as the potting material was a two-component thermosetting urethane resin (SA- 6330A2/SA-6330B5 (trade name), manufactured by Sanyu Rec, Ltd.). At a time point that fluidization stopped due to progress of curing reaction of the potting material, rotation of the centrifuge was stopped, and the product was taken out and cured by heating in an oven at 50° C.

Subsequently, the end on the second tubular member side of the housing was cut, so as to open the hollow portions on the side that the hollow portions were closed in a phase before adhesion. On the other hand, the cylindrical members were removed from the first adhesively-fixed portion on the first tubular member side, so as to form a plurality of through holes.

At this time, when a circle connecting the hollow fiber membranes existing on an outermost circumferential portion of a cutting end face of the second adhesively-fixed portion is defined as a cutting end face circle, a range of a circle having a center at the center of the cutting end face circle and a radius equal to ½ of the radius of the cutting end face circle is defined as a central portion, and a range other than the central portion is defined as a circumferential portion, the area ratios of the potting materials and the regulating members in the central portion and the circumferential portion were respectively 48.3% and 60.9%. Namely, the ratio of the area ratio of the potting materials and the regulating members in the central portion to the area ratio of the potting materials and the regulating members in the circumferential portion was 0.79. The circular ranged illustrated with dotted line in FIG. 6 represents the central portion, and the other range represents the circumferential portion.

Subsequently, the hollow fiber membrane module was installed to a filtering device with the side that the hollow portions are opened as the upper side, and was subjected to the following physical washing durability test. The effective membrane length of the present hollow fiber membrane module was 2 m.

Clean water was supplied from the second adhesively-fixed portion side on the upper side at a flow rate of 8 m$^3$/hr, and simultaneously, air was supplied to the through holes of the first adhesively-fixed portion on the lower side at a flow rate of 7 m$^3$/hr. The two supplied fluids were discharged from the nozzle of the second tubular member on the upper side. The aforementioned operation was performed continuously except for a monthly leak test. The water temperature during operation was maintained at 5° C.

After 6 months of operation, leak due to breakage of hollow fiber membrane occurred to 50 hollow fiber membranes.

After the test, the membrane module was dismantled to certify the state of the second adhesively-fixed portion on the filtering side. The thickness of the second adhesively-fixed portion on the filtering side was in a range of 29 mm to 40 mm, and the maximum length of the raised portions was 22 mm.

REFERENCE SIGNS LIST

1 hollow fiber membrane module
2 hollow fiber membrane
3 hollow fiber membrane bundle
5 housing
5a annular uneven portion
5b outer region
5c external region
7 straightening cylinder
7a flange
8 protecting member
10, 11 cap
10a, 11a piping
12 sanitary gasket
13 clamp
20 first adhesively-fixed portion
20a through hole
21 second adhesively-fixed portion
30 through-hole
40 regulating member
41 regulating member
50 raised portion
52a nozzle
P potting material
S interface of potting material

The invention claimed is:

1. A hollow fiber membrane module comprising:
   a hollow fiber membrane bundle formed by bundling a plurality of hollow fiber membranes;
   a tubular housing in which the hollow fiber membrane bundle is housed;
   a first adhesively-fixed portion configured to adhesively fix, at one end of each of the hollow fiber membranes, with a resin material, the hollow fiber membranes to each other, and the hollow fiber membrane bundle to an inner wall of the housing;
   a second adhesively-fixed portion configured to adhesively fix, at the other end of each of the hollow fiber membranes, with a resin material, the hollow fiber membranes to each other, and the hollow fiber membrane bundle to the inner wall of the housing; and
   a regulating member having only a shape of a solid cylinder being disposed on at least one of the first adhesively-fixed portion or the second adhesively-fixed portion, and configured to regulate arrangement of the hollow fiber membranes, wherein:
   on an end face outer than the housing of at least one of the first adhesively-fixed portion or the second adhesively-fixed portion, when a range of a circle having a center at a center of the end face and a radius equal to ½ of a radius of the end face is defined as a central portion, and a range other than the central portion is defined as a circumferential portion, a ratio of an area ratio of the regulating member and the resin material to an entire area of the central portion to an area ratio of the regulating member and the resin material to an entire area of the circumferential portion is 0.8 or more and 1.2 or less.

2. The hollow fiber membrane module according to claim 1, wherein:
   a ratio of an entire area of end faces of thick wall portions of the hollow fiber membranes included in the central portion to the entire area of the central portion is 50% or more.

3. The hollow fiber membrane module according to claim 1, wherein:
   each of the hollow fiber membranes has a hollow portion closed at one end and opened at another end.

4. The hollow fiber membrane module according to claim 3, wherein:
   on an end face outer than the housing of the first adhesively-fixed portion or the second adhesively-fixed portion on the other end at which the hollow portion of each of the hollow fiber membranes is opened, the ratio of the area ratio of the regulating member and the resin material to the entire area of the central portion to the area ratio of the regulating member and the resin material to the entire area of the circumferential portion is 0.8 or more and 1.2 or less.

5. The hollow fiber membrane module according to claim 1, wherein:
the first adhesively-fixed portion or the second adhesively-fixed portion on a one end at which the hollow portion of each of the hollow fiber membranes is closed has at least one through hole configured to introduce liquid supplied from outside of the housing into a space inside the housing between the first adhesively-fixed portion and the second adhesively-fixed portion.

6. The hollow fiber membrane module according to claim 1, wherein:
in at least one of the first adhesively-fixed portion or the second adhesively-fixed portion on an end at which a hollow portion of each of the hollow fiber membranes is opened, raised portions formed by the resin material raised from an interface of the resin material inside the housing, along a surface of each of the hollow fiber membranes, have a length of 20 mm or less from the interface.

7. The hollow fiber membrane module according to claim 1, wherein:
at least one of the first adhesively-fixed portion or the second adhesively-fixed portion on an end at which a hollow portion of each of the hollow fiber membranes is opened has a minimum thickness part having a minimum thickness $D0$ and a maximum thickness part having a maximum thickness $D1$ such that $D1 \leq 120\% \times D0$ is satisfied.

8. The hollow fiber membrane module according to claim 1, wherein:
the regulating member is arranged in both the central portion and the circumferential portion.

9. A filtering method comprising performing filtration by using the hollow fiber membrane module according to claim 1.

10. The hollow fiber membrane module according to claim 2, wherein:
each of the hollow fiber membranes has a hollow portion closed at one end and opened at another end.

11. The hollow fiber membrane module according to claim 1, wherein:
the regulating member is a plurality of regulating members each having only a shape of a solid cylinder being equally distributed spanning the entire end face of the hollow fiber membrane bundle.

* * * * *